(12) United States Patent
Chan

(10) Patent No.: US 7,357,070 B2
(45) Date of Patent: Apr. 15, 2008

(54) DOMESTIC APPLIANCES

(75) Inventor: Wing Kin Chan, Hong Kong (CN)

(73) Assignee: Dickson Industrial Co., Ltd., Kowloon, Hong Kong SAR (CN)

( * ) Notice: Subject to any disclaimer, the term of this patent is extended or adjusted under 35 U.S.C. 154(b) by 465 days.

(21) Appl. No.: 10/488,299

(22) PCT Filed: Sep. 3, 2002

(86) PCT No.: PCT/IB02/03573

§ 371 (c)(1), (2), (4) Date: Sep. 22, 2004

(87) PCT Pub. No.: WO03/020096

PCT Pub. Date: Mar. 13, 2003

(65) Prior Publication Data

US 2005/0016381 A1    Jan. 27, 2005

(30) Foreign Application Priority Data

Sep. 3, 2001    (HK) ............................... 01106196.8

(51) Int. Cl.
  *A47J 31/44*    (2006.01)
  *A47J 27/212*    (2006.01)
(52) U.S. Cl. .......................... 99/285; 99/275; 219/429; 219/438
(58) Field of Classification Search ............... 99/285, 99/275, 306, 307; 219/438, 429
  See application file for complete search history.

(56) References Cited

U.S. PATENT DOCUMENTS

| | | | |
|---|---|---|---|
| 5,957,034 A * | 9/1999 | Sham et al. ................... | 99/285 |
| 6,118,933 A * | 9/2000 | Roberson ..................... | 392/442 |
| 6,818,866 B2 * | 11/2004 | Gordon ....................... | 219/438 |
| 2003/0159588 A1 * | 8/2003 | Croll .......................... | 99/275 |

FOREIGN PATENT DOCUMENTS

| | | |
|---|---|---|
| DE | 299 21 433 | 3/2000 |
| GB | 2 332 522 A | 6/1999 |
| WO | 98 27851 A | 7/1998 |
| WO | 00 65967 A | 11/2000 |
| WO | 02 00072 A | 1/2002 |

* cited by examiner

Primary Examiner—Reginald L. Alexander
(74) Attorney, Agent, or Firm—Buchanan Ingersoll & Rooney PC

(57) ABSTRACT

This invention provides a domestic appliance (1) such as a kettle, coffee maker, and toaster or similar that includes a fluid chamber (3). The fluid chamber (3) is provided with a light to diffuse through the fluid and is visible through a transparent or translucent portion in the exterior wall of the wall of the chamber. The light may be controlled to show different operative states of the appliance and provide a large visual area of indication of the operative.

14 Claims, 6 Drawing Sheets

DOMESTIC APPLIANCES

FIELD OF THE INVENTION

This invention relates to domestic appliances and, more particularly, to domestic appliances with a reservoir, such as water heating and beverage making apparatus as well as other apparatus such as toasters, blenders, etc. More specifically, although not solely. This invention relates to apparatus in the forms of domestic appliances such as kettles, coffee percolators or other similar items to either heat water for beverage production or further process heated fluids into a completed beverage.

BACKGROUND TO THE INVENTION

Domestic appliances for heating water or making hot beverages usually come in a form of kettles, coffee percolators or similar apparatus. While such domestic appliances provide useful utility, they can be harmful and potentially dangerous to the user because of the heated fluid they carry. Other potentially harmful appliances to a user exist in the form of toasters, blenders, etc. with a hot exterior which can harm a user if they are unaware of the operative state of the appliance.

On the majority of such appliances, some visual indication is provided for the status of the appliance as to whether the appliance is switched on or off. This is particularly important on apparatus such as coffee percolators where there is a likelihood that the apparatus will not only produce the beverage but also maintain the beverage on a heated plate for use over a period of time.

The usual method for indicating the status of the appliance is to provide some kind of visual indication being either the position of the off-on switch or, on many appliances, an indicating light. However, such indicating lights are generally given by small low-powered lamps provided on one side of the apparatus and may not always be apparent to a user or, sometimes, the lamps are just not conspicuous enough as low-wattage lamps are always preferred to minimize non-critical energy consumption. This increases the likelihood of the apparatus being left onto either damage the apparatus or catch a user unawares, such as a user may find themselves on a heated portion of the apparatus without appreciating that the apparatus was on.

For example, in the case of kettles or similar, it may be desirable to know when the kettle has achieved a desired temperature. Most such appliance which is purely for heating water for making a beverage will have some form of automatic cut-off, generally relying on a steam-operated switch or similar. However, the operation of that switch does not provide much of an indication to a user that the state of the apparatus has changed and that the water has achieved the desired temperature. Unless the user specifically notes the position of the switch or hears a small audible click once the switch activates, there is little other provision of indicators. Again, a small indicating light could be provided although this also depends on the positioning of the light and once the risk of not being particularly apparent to a user at a distance or from a side of the appliance that masks the indicating light itself.

Other domestic appliances such as toasters or blenders may also benefit from a more visible indication of the operative state of the appliance to avoid harm to a user that is unaware the appliance is on.

It may be desirable to provide a further form of indication which, if possible, can also add to the aesthetic appearance of the appliances by providing a new visual effect. Preferably, such an indication carries with it practical utility.

OBJECT OF THE INVENTION

It is an object of the present invention to provide such an apparatus that may overcome some of the disadvantages of the prior art and/or provide a new aesthetic effect to such appliances or at least provide the public with a useful choice. It is a particular object of this invention to provide heated domestic appliances having a reservoir with visible means which overcome at least some of the shortcomings of the appliances known while providing practical utility.

SUMMARY OF THE INVENTION

Accordingly, in a first aspect, the invention may broadly be said to consist in a domestic appliance comprising:
  at least one fluid chamber;
  at least one portion of said fluid chamber being transmissible to light in the visible range;
  a light emitter or light source to emit light towards and through said fluid such that defused light through said fluid is visible through the light transmissible panel of said fluid chamber; and
  Preferably, said light emitter indicates the operative state of the appliance.

Preferably, the fluid contained in said fluid chamber or said fluid chamber itself forms an illuminated display means when illuminated by said light source.

Preferably said light transmissible panel is a transparent or translucent portion of said fluid chamber.

Preferably said light emitter comprises a light bulb directing light into said fluid.

Preferably, said light emitter or light source includes a distributed light source.

Preferably, said distributed light source is ultra-violet light source giving out both visible light and invisible ultra-violet radiation.

Preferably said fluid chamber comprises a fluid chamber for a percolator and said heating means is associated with said fluid chamber to heat fluid passing from at least one first fluid chamber to a second fluid chamber.

Preferably further heating means is provided to maintain heat and said second fluid chamber.

Alternatively said domestic appliance comprises a kettle and said light emitter emits light directly into fluid being heated within said chamber.

Preferably said light emitted into a chamber of said kettle is emitted from a side of the chamber.

Preferably said light emitted from a side of said chamber is emitted from a light emitter positioned in a handle portion of said appliance.

Preferably a further light emitter is provided to emit light in an ultra-violet waveband.

Preferably multiple light emitters are provided to indicate different states of the apparatus or appliance.

Preferably said appliance includes a controller to control the illumination of different lights or varied illumination of a single light emitter in accordance with different operative states of said apparatus.

Further aspects of the invention may become apparent to those skilled in the art to which the invention relates upon reading the following description.

BRIEF DESCRIPTION OF THE DRAWINGS

Preferred embodiments of the invention will now be described by way of examples and with reference to the following drawings, in which.

DETAILED DESCRIPTION OF PREFERRED EMBODIMENTS

Figure 1:
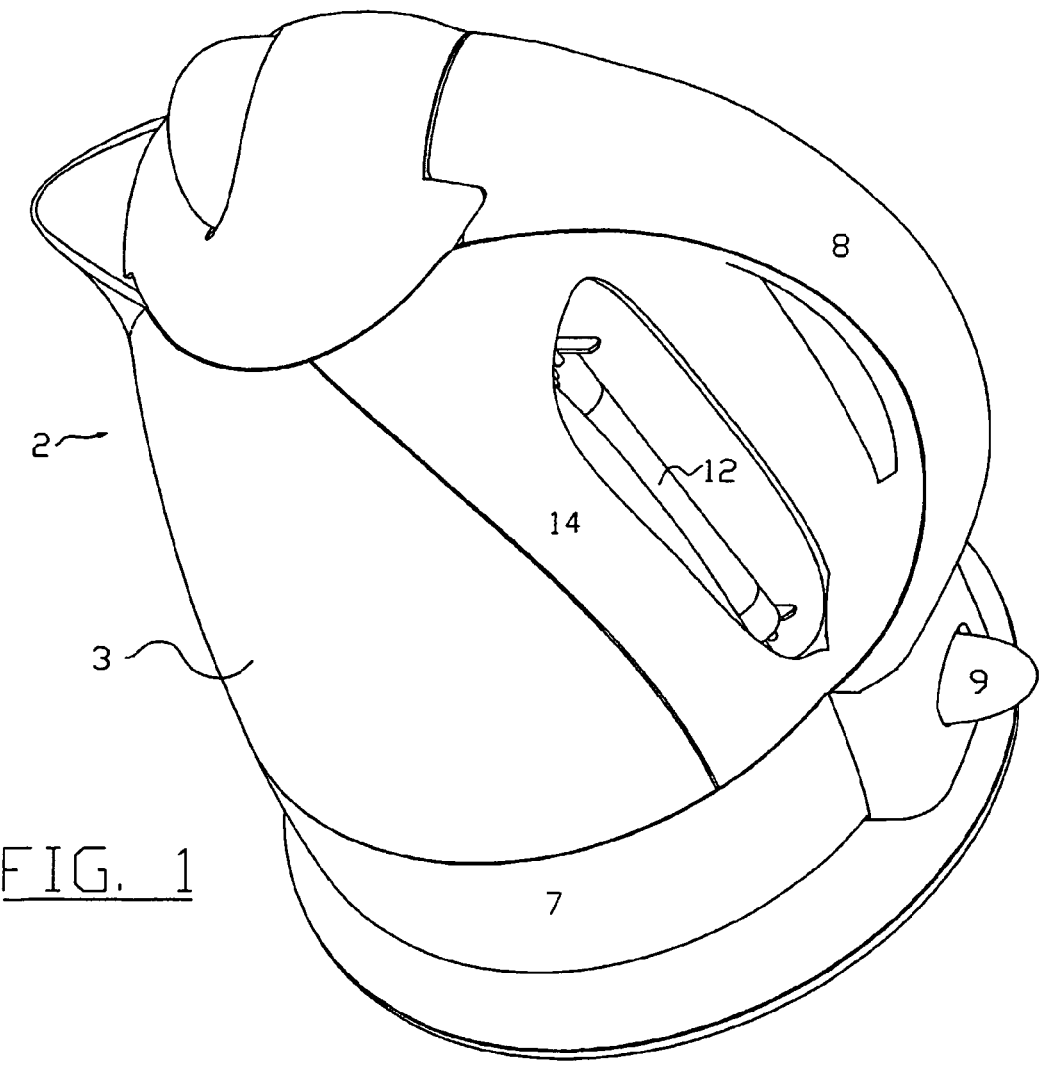
FIG. 1 is a perspective view of a kettle showing a first embodiment of the apparatus of the present invention.
Figure 2:
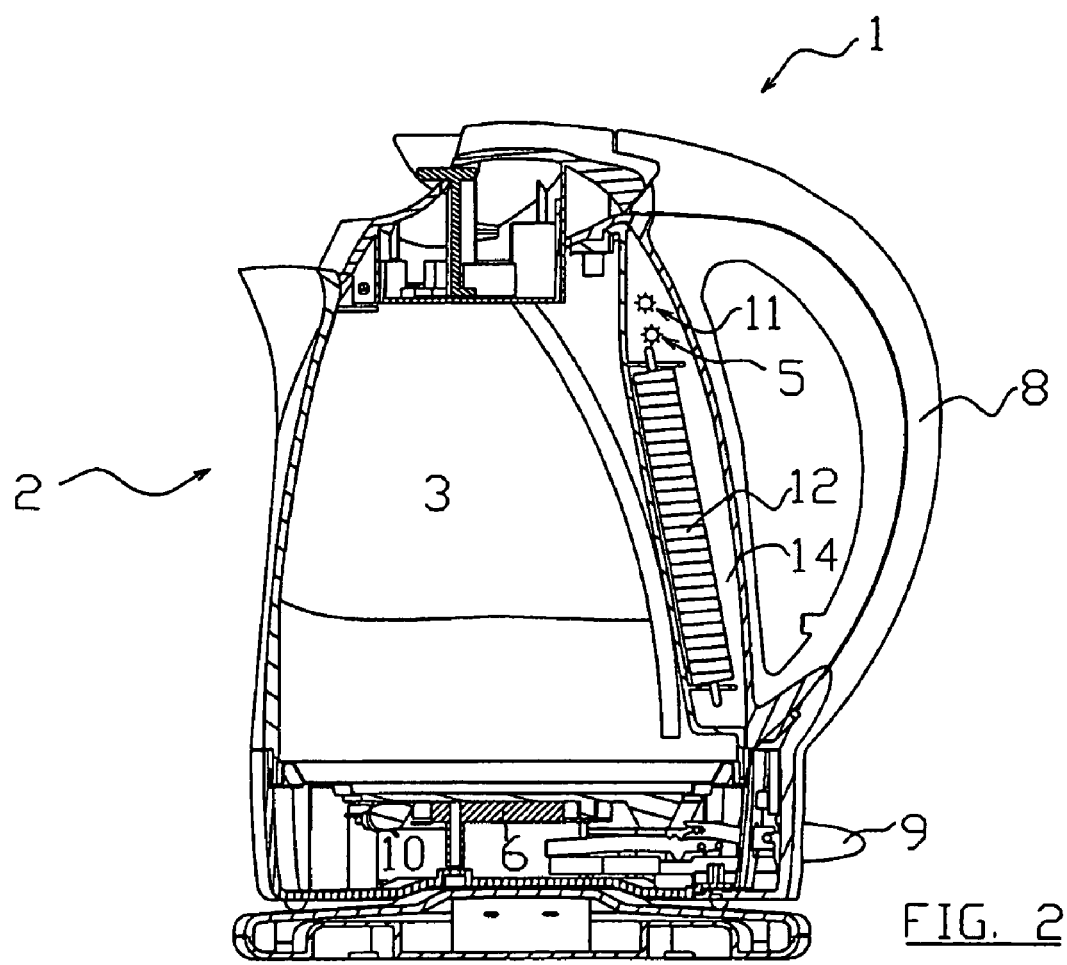
FIG. 2 shows a longitudinal cross-sectional view of the apparatus of FIG. 1.
Figure 3:
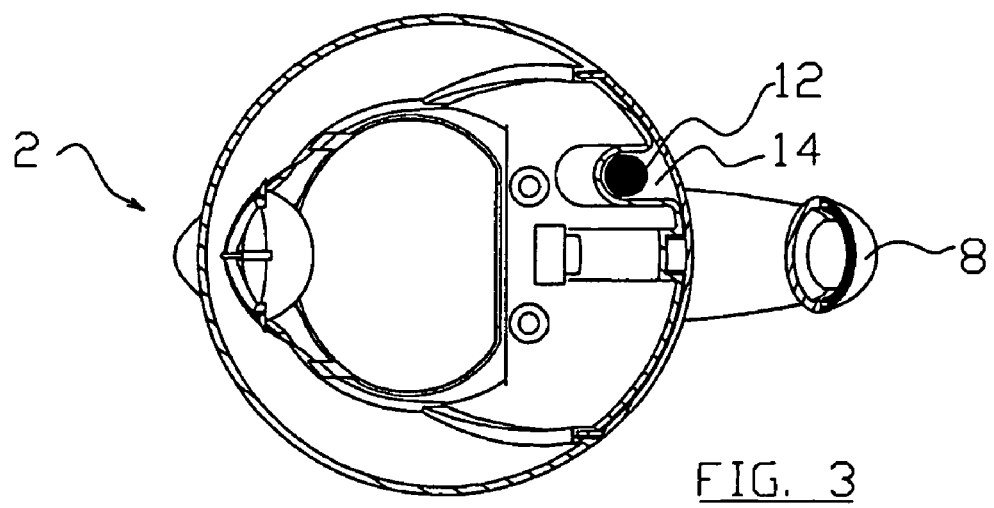
FIG. 3 shows a transversal cross-sectional view of the apparatus of FIG. 1.

Referring to the drawings, a domestic appliance 1 is shown in FIGS. 1 to 3 in the form of a kettle or other water heating apparatus. It will be appreciated that the water heating apparatus can be used for heating other beverage fluids and the kettle as shown is merely indicative of the type of apparatus to which the invention may relate.

The domestic appliance 1 in the form of a kettle 2 contains a main fluid-containing chamber 3. The fluid containing chamber 3 should contain at least one portion that is transmissible to visible light. In this particular example, the main generally circumferential sidewalls 4 can be made from a transparent or translucent material such as glass of specific colours or other materials such as plastics or the like. In this particular embodiment, the majority of the outer surface area of the fluid container or chamber 3 is provided in a substantially transparent material. Of course, this could be varied to only provide a specific portion or panel in the fluid container of such a suitable material.

This particular embodiment provides the appliance in the form of a kettle and, as a consequence, provides the heating element 6 to heat the fluid within the container 3. Typically the heating element is provided in a base portion 7 of the apparatus.

A handle portion 8 is provided together with a switch 9 for operating the appliance and a controller 10.

As shown in FIG. 1, a light emitter 5 which, in this embodiment is provided in the form of a light bulb, can be placed to transmit light into the fluid chamber 3. The light may be directed to diffuse through the fluid held within the chamber 3.

When provided in combination with the transparent or translucent or otherwise light transmissible portion of the reservoir or the fluid chamber 3, the lighting emitter 5 is able to provide a significant area of visible light passing through the transmissible portion having been diffused through the fluid within the fluid chamber 3.

The lighting emitter is able to be utilized as an indicator of the operative state of the appliance. For example, the lighting emitter 5 can provide any particular desired colour of light through the fluid and through the transmissible portion to indicate that the appliance is switched on.

In this preferred embodiment as shown in FIG. 1, it can be seen that three light emitters are provided with the additional light emitters being a visible light spectrum bulb 11 and an ultra-violet light emitter 12. The ultra-violet light emitter is preferably a ultra-violet tube which preferably emits both visible light as well as invisible ultra-violet radiation. Also, a light tube is preferred as it gives out more distributed light.

As shown in FIG. 1, the apparatus is at least partially filled with fluid and the ultra-violet light emitter 12 can be utilized to provide some treatment of the water within the fluid container 3 so as to assist in the killing of bacteria or similar. Of course, this may be an optional preference in this embodiment. The ultra-violet light emitter 12 may be engaged for a short period or continuously as desired. Of course, as the ultra-violet light emitter 12 provides additional utility as well as giving visible indication, the ultra-violet emitter 12 can be set as a standard feature with the other lights being optional or can be removed.

The light emitters 5 and 11 can provide visibly different forms of light through the fluid to indicate different operative conditions of the appliance. For example, the light emitters 5 and 11 may be of different colours or similar with one light as shown in FIG. 2 being the light 5 emitting a specific colour while the water is being heated towards boiling by the heating element 6. In its simplest form, the light emitter 5 can simply be switched with the heating element 6.

Upon reaching boiling point, the heating element 6 may be switched off entirely or reduced to simply maintain heat in the water. During this period, an alternative light 11 can be utilized to diffuse a different colour through the water to provide immediate visual indication to a user of the change of operative state.

Of course, it will be apparent that a single light emitter can be utilized to emit different colours upon receiving different inputs. This is particularly the case if solid-state light source are used in the form of light emitting diodes or similar.

In this example, the lights 5, 11 and 12 can be provided in a housing portion 14 adjacent the handle 8. This may be a more desirable solution for a kettle of this form. In providing such lights on a kettle 2, consideration needs to be made to the position of the heating element 6 and the proximity of the lights and associated wiring to that heating element. It may not be desirable to provide the lights particularly close to the heating element 6 nor, in some circumstances, directly above the heating element 6 in an upper portion as shown in the previous figures. If the light emitters are placed in the lid portion of the kettle 2, consideration must be taken to account for steam generation within the fluid chamber 3 that may interfere with the housing, manufacture and operation of the lights.

In addition, as the light emitting arrangement is placed in a generally transparent compartment partly surrounded by the fluid container 3, the emitted light can be more effectively dispersed or diffused into the fluid contained in the fluid container or even to the fluid container to facilitate a "large-screen" display effect.

Figure 4:
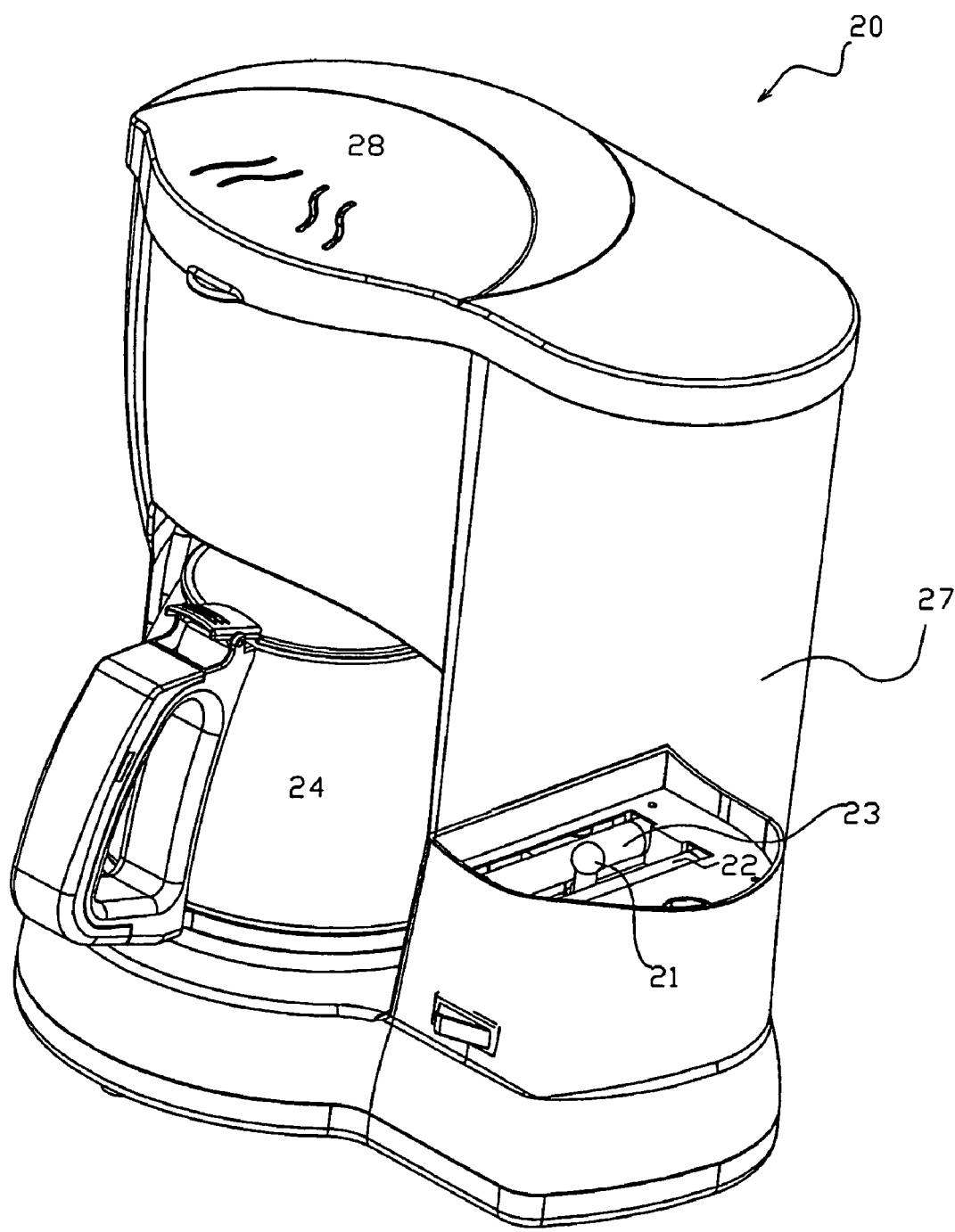
FIG. 4 is a perspective view showing a second embodiment of the invention.
Figure 5:
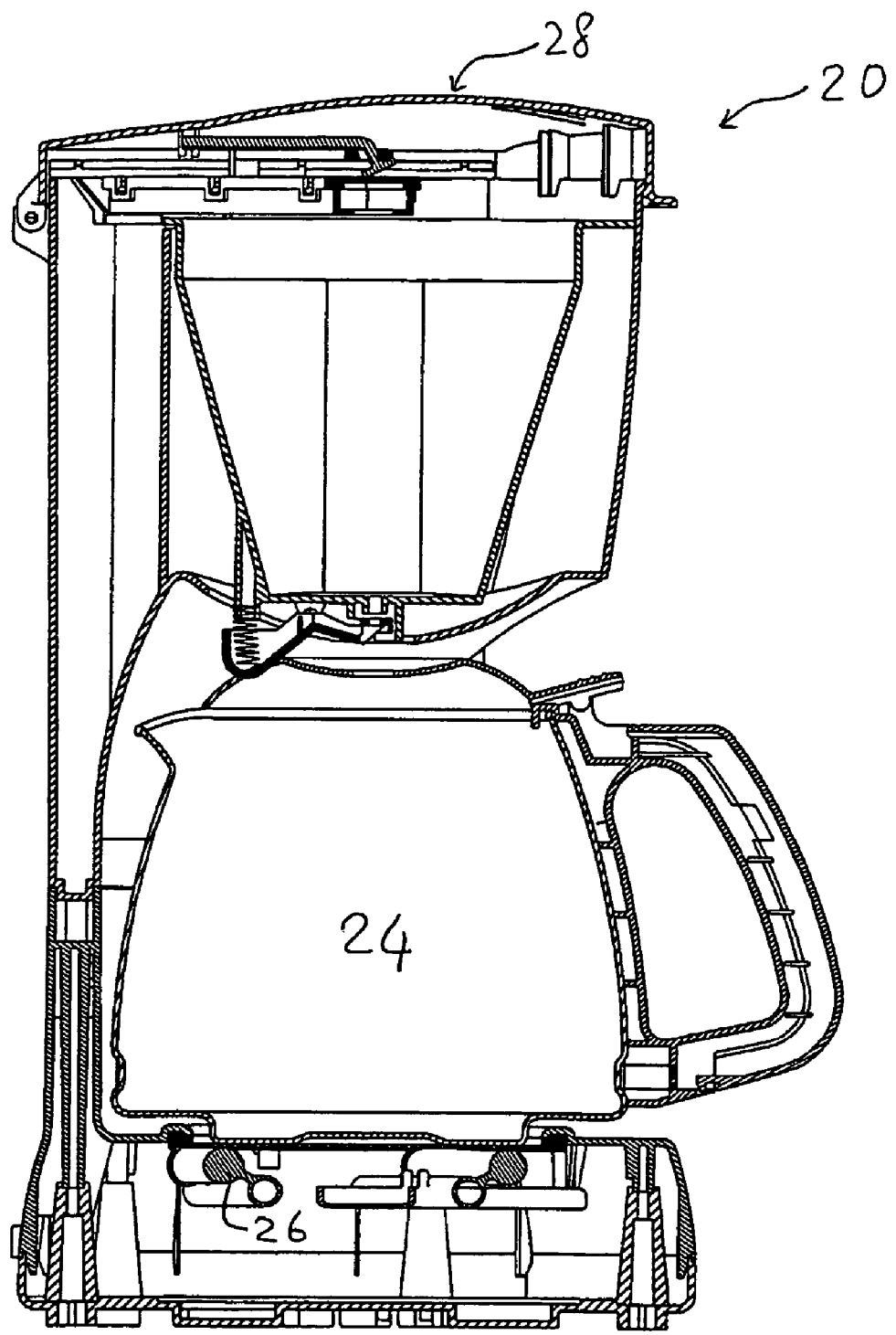
FIG. 5 shows a longitudinal cross-sectional view of the apparatus of FIG. 4.
Figure 6:
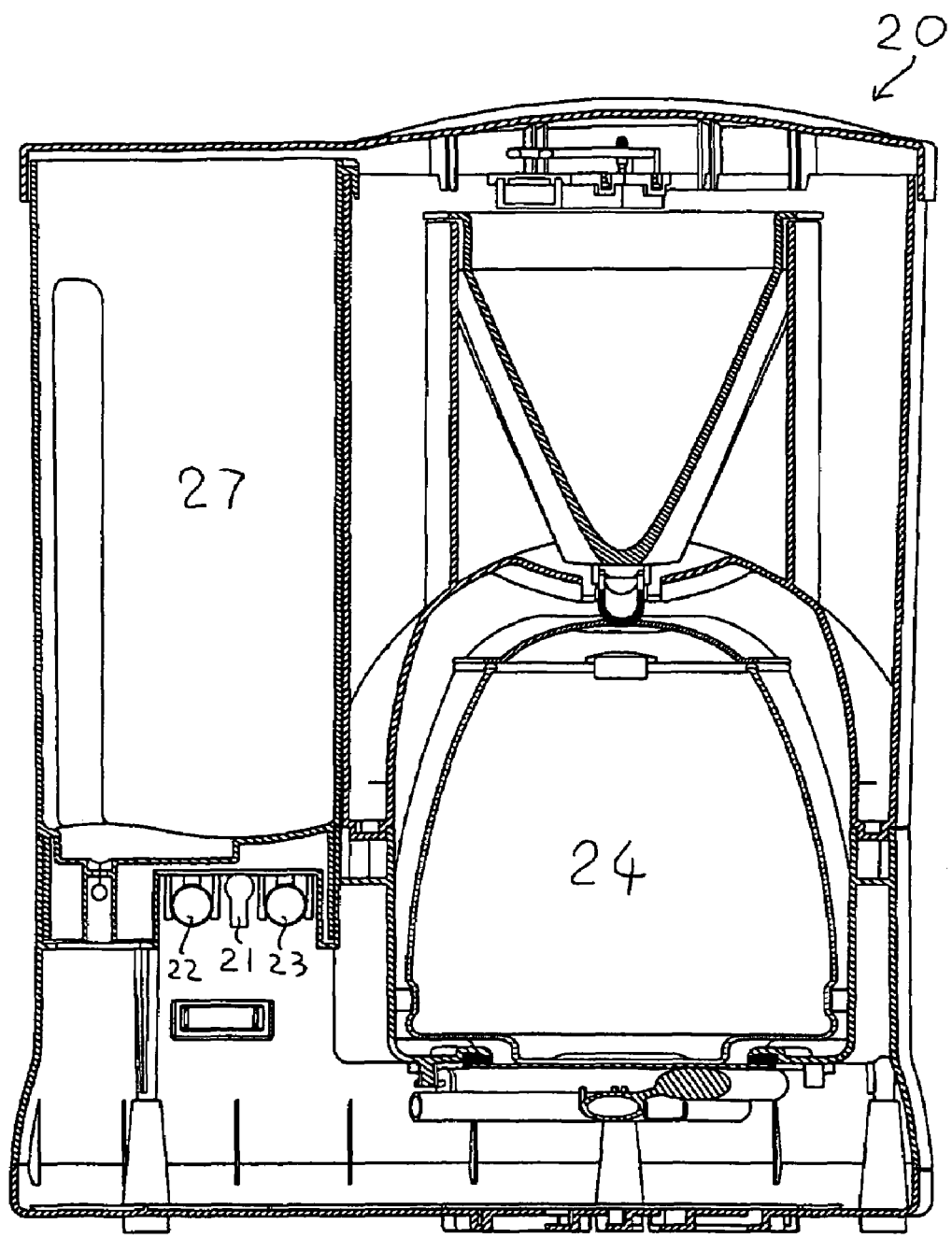
FIG. 6 shows another longitudinal cross-section of the apparatus of FIG. 4.

A further appliance is shown in FIGS. 4 to 6 in the form of a coffee maker or percolator 20. Here it can be seen that the light emitters 21, 22 and a UV emitter 23 are provided in the cold water tank 27 of the appliance. Of course, one or more could be provided to shine or diffuse through the heated chamber 24 also, however, the generally dark nature of coffee may require careful selection of an appropriate source of light to achieve the desired aims.

By providing multiple or variable lights 21 and 22, the coffee maker can indicate different states such as the production of coffee into the chamber 24 and then the maintenance of the heating element 26 to keep the coffee hot.

In general, it will be noted that the lights may be placed anywhere that conveniently provides light to the tank and may even be placed in the lid 28 of the apparatus 20 or in the base of the tank as shown in the previous FIG. 6. Although the effect of moisture to the lights will require due consideration in the light source is placed in the lid 28.

Figure 7:
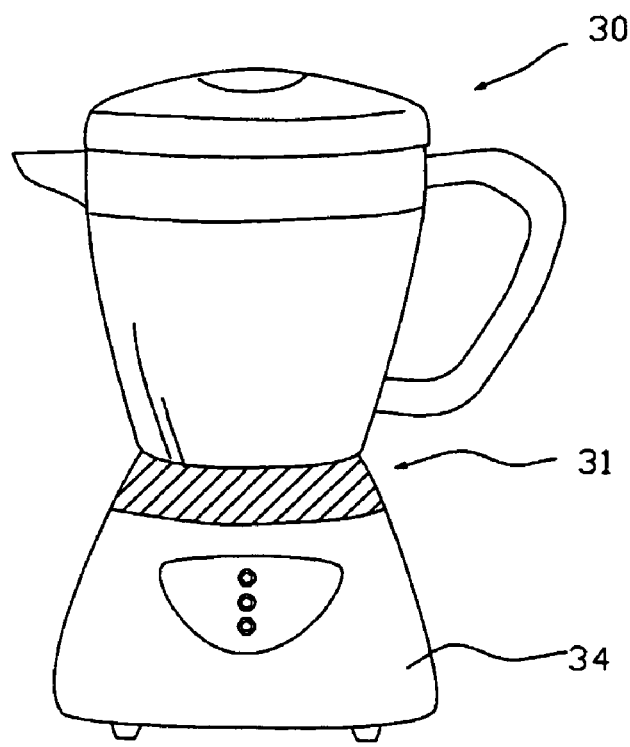
FIG. 7 shows a perspective view of a further embodiment of the apparatus.
Figure 8:
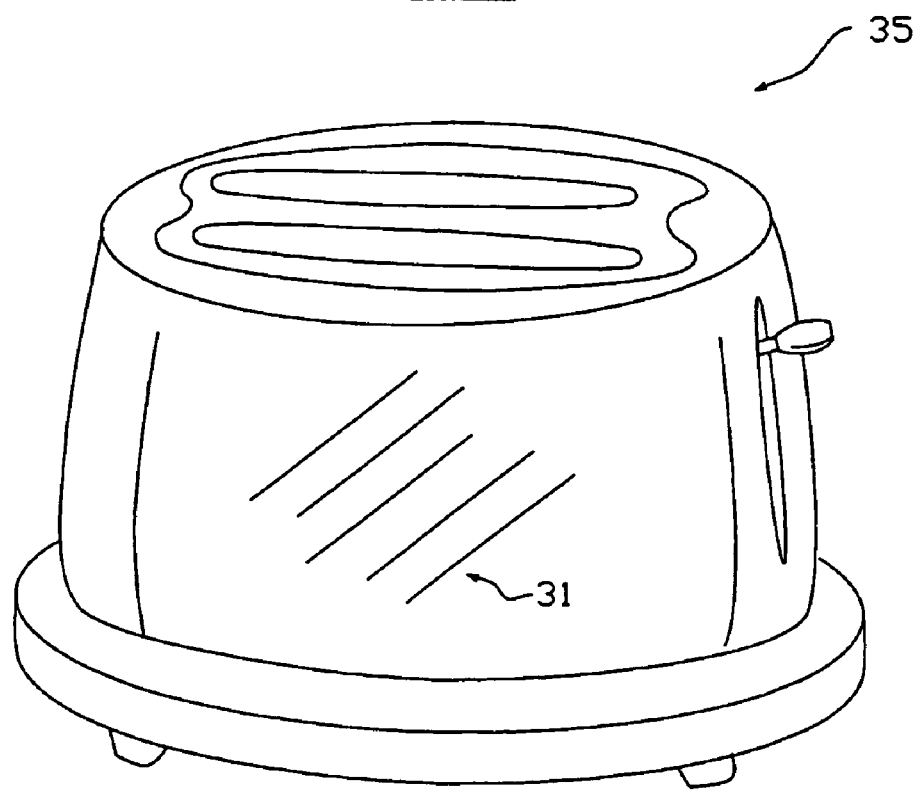
FIG. 8 shows a perspective view of a yet further embodiment of the apparatus.

FIGS. 7 and 8 show a blender 30 and a toaster 35 respectively. In these two figures, a fluid chamber 31 and 36 respectively is provided in appliances where water is not an integral part of the operation of the apparatus. Unlike the kettle where water forms part of the operation, here the fluid chamber is provided purely to act as a large diffuser to an indicating light and add aesthetic value to the appliance as a whole.

The blender 30 in FIG. 7 is shown to include the visible chamber at the base of the blending unit 33, and above the motor housing 34.

The toaster 35 provides the chamber in a ring like fashion around the base of the toaster.

A variety of other positions could be utilised to provide a large indicating area for the diffused light. diffused light occurring through water retained in a transparent chamber in the appliance.

When applied to kettles or similar, the water held within the appliance itself as part of its normal operation can be used.

Regardless, a user can identify the state of the appliance from a distance and be wary of heated appliances or those where care should be taken while switched into a particular operative condition. Furthermore, this can be achieved while providing a particular aesthetic appearance to the appliances.

The invention has been described with reference to preferred embodiments that are exemplary of the invention although should not be considered limiting to the scope of the invention as defined in the appended claims. Specific integers referred to throughout the description may be deemed to incorporate known equivalents where appropriate.

The invention claimed is:

1. A domestic appliance comprising:
a housing defining at least one fluid chamber and a handle portion;
a heating means for heating said fluid chamber;
at least one portion of said fluid chamber being transmissible to light in the visible range;
an elongated light emitter extending alongside said handle portion and said fluid chamber and arranged to emit light distributedly towards and through fluid in said fluid chamber such that light through said fluid is visible through a light transmissible panel of said fluid chamber; and
said elongated light emitter arranged to indicate the operative state of the appliance during use and placed in a compartment intermediate said fluid chamber and said handle portion.

2. A domestic appliance as claimed in claim 1 wherein said light transmissible panel is a transparent or translucent portion of said fluid chamber.

3. A domestic appliance as claimed in claim 1 wherein said light emitter comprises a light tube for dispersing light into said fluid.

4. A domestic appliance as claimed in claim 1 wherein said fluid chamber comprises a fluid chamber for a percolator and said heating means is associated with said fluid chamber to heat fluid passing from at least one first fluid chamber to a second fluid chamber.

5. A domestic appliance as claimed in claim 4 wherein a further heating means is provided to maintain heat in said second fluid chamber.

6. A domestic appliance as claimed in claim 1 wherein said domestic appliance comprises a kettle and said light emitter emits light directly into fluid being heated within said fluid chamber, said compartment being adjacent said handle portion.

7. A domestic appliance as claimed in claim 6, wherein said light emitted into a chamber of said kettle is emitted from a side of the fluid chamber.

8. A domestic appliance as claimed in claim 7 wherein said light emitted from a side of said fluid chamber is emitted from a light emitter positioned adjacent said handle portion of said appliance.

9. A domestic appliance as claimed in claim 1 wherein a further light emitter is provided to emit light in an ultraviolet waveband.

10. A domestic appliance as claimed in claim 1 further comprising multiple light emitters for indicating different states of the appliance.

11. A domestic appliance as claimed in claim 1 wherein said appliance includes a controller to control the illumination of different lights or varied illumination of a single light emitter in accordance with different operative states.

12. A domestic appliance as claimed in claim 1 wherein said appliance provides a fluid chamber in or adjacent a base of the appliance to indicate the operative state of the appliance.

13. A domestic appliance as claimed in claim 12 wherein said appliance comprises a toaster.

14. A domestic appliance as claimed in claim 12 wherein said appliance comprises a blender.

* * * * *